United States Patent [19]

Lee

[11] Patent Number: 5,704,763
[45] Date of Patent: Jan. 6, 1998

[54] SHEAR JET COOLING PASSAGES FOR INTERNALLY COOLED MACHINE ELEMENTS

[75] Inventor: Ching-Pang Lee, Cincinnati, Ohio

[73] Assignee: General Electric Company, Cincinnati, Ohio

[21] Appl. No.: 561,138

[22] Filed: Aug. 1, 1990

[51] Int. Cl.⁶ .................................................. B63H 1/14
[52] U.S. Cl. ........................................ 416/96 R; 415/115
[58] Field of Search ........................... 416/96 R, 96 A, 416/97 R; 415/115, 116

[56] References Cited

U.S. PATENT DOCUMENTS

| | | | |
|---|---|---|---|
| 2,843,354 | 7/1958 | Smith | 253/39.15 |
| 2,864,405 | 12/1958 | Young | 416/96 A |
| 2,888,243 | 5/1959 | Pollock | 253/39.15 |
| 2,956,773 | 10/1960 | French | 253/39.15 |
| 3,044,745 | 7/1962 | Stark | 253/39.15 |
| 3,533,712 | 10/1970 | Kercher | 416/92 |
| 3,819,295 | 6/1974 | Hauser et al. | 416/97 |
| 4,359,310 | 11/1982 | Endres et al. | 415/115 |
| 4,514,144 | 4/1985 | Lee | 416/96 R |
| 4,515,526 | 5/1985 | Levengood | 416/96 R |
| 4,604,031 | 8/1986 | Moss et al. | 416/97 |
| 4,627,480 | 12/1986 | Lee | 164/369 |
| 4,684,322 | 8/1987 | Clifford et al. | 416/95 |
| 4,786,233 | 11/1988 | Shizuya et al. | 416/96 R |
| 5,002,460 | 3/1991 | Lee et al. | 416/96 A |

OTHER PUBLICATIONS

ASME Paper No. 62–WA–176, "Friction and Forced Convection Heat–Transfer Characteristics in Tubes with Twisted Tape Swirl Generators", by E. Smithberg and F. Landis, 1962, pp. 1–10.

*Primary Examiner*—Charles T. Jordan
*Attorney, Agent, or Firm*—Andrew C. Hess; Patrick R. Scanlon

[57] ABSTRACT

A cooling passageway construction particularly adapted for cooling the interior of a heated turbine engine assembly and/or airfoil blade includes an undulating partition which subdivides the passageway into first and second subpassages. The partition defines localized minimum throat areas within each subpassage to produce localized shear jet flow between the partition and the walls of the passageway. Bleed holes may be formed through the partition to generate additional turbulence within the coolant flow and further enhance heat transfer.

20 Claims, 5 Drawing Sheets

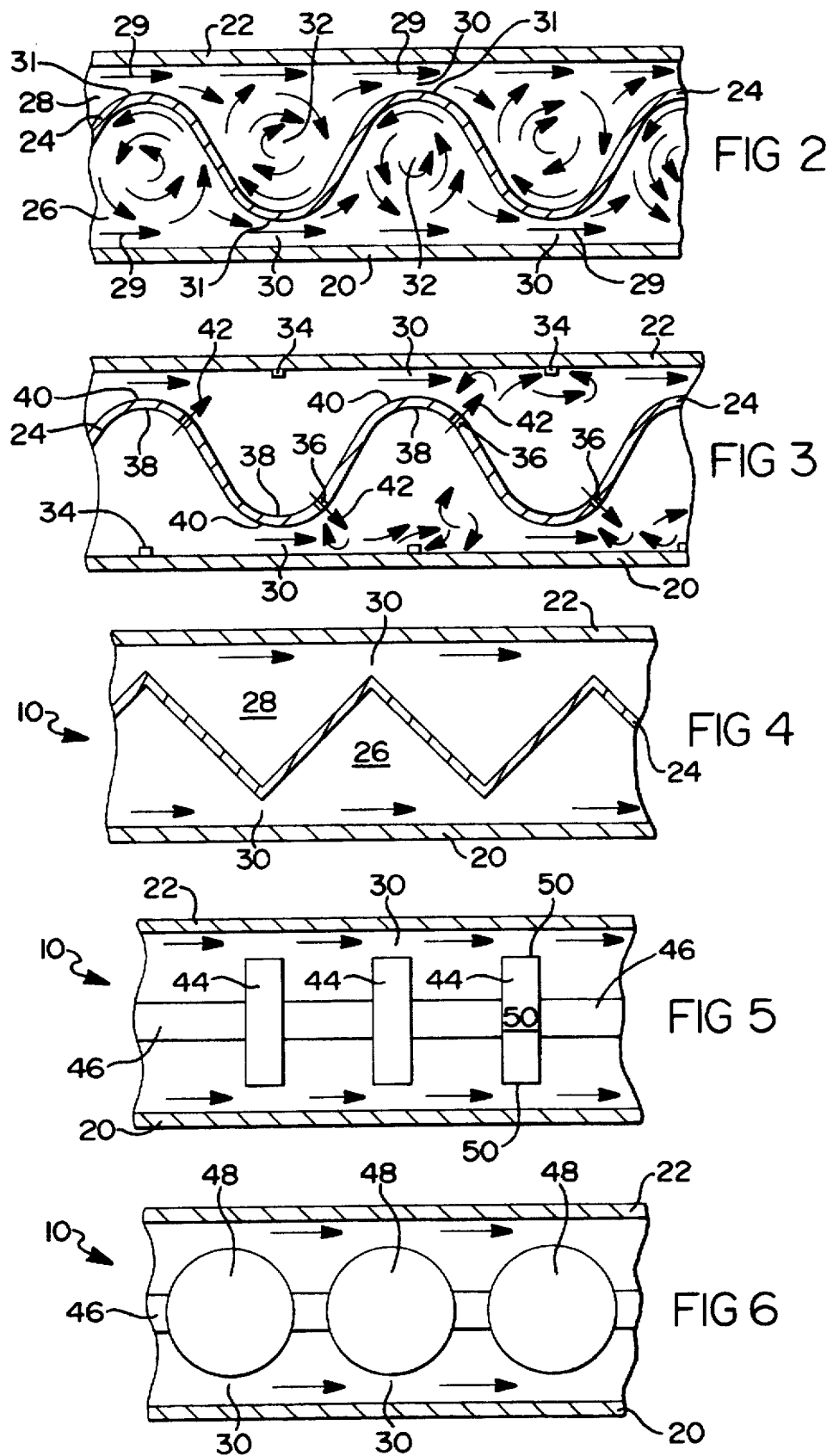

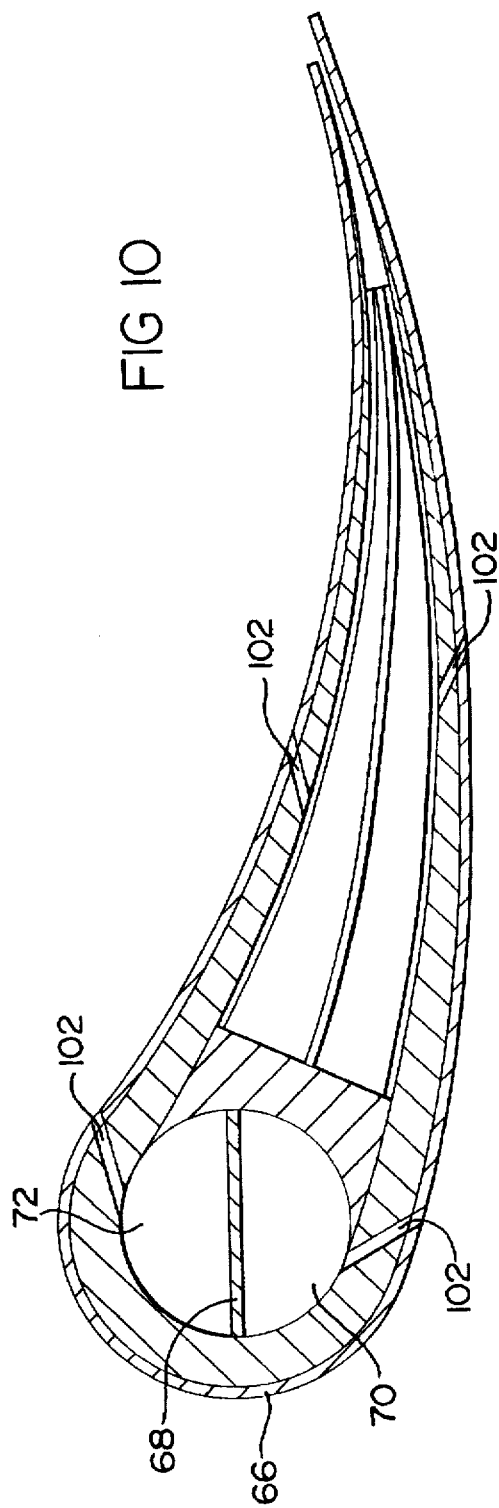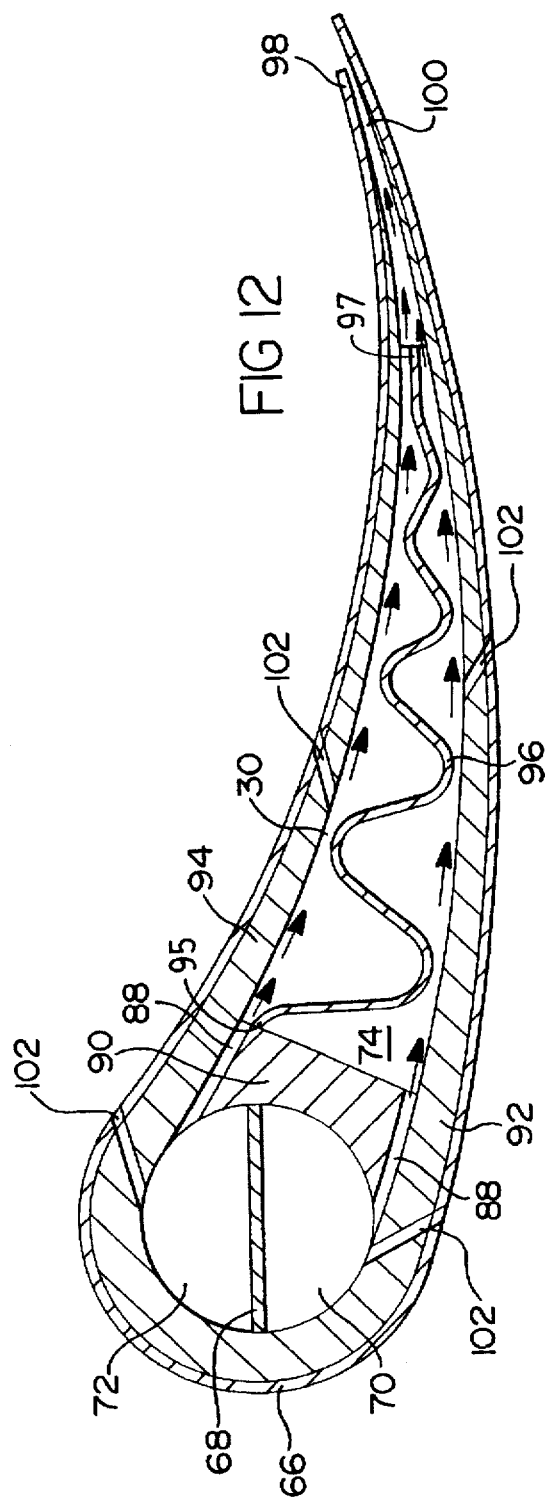

SHEAR JET COOLING PASSAGES FOR INTERNALLY COOLED MACHINE ELEMENTS

BACKGROUND OF THE INVENTION

1. Field of the Invention

The present invention relates in general to convective cooling within hollow machine parts and particularly relates to the generation of turbulent flow within a cooling passage formed within a gas turbine engine.

2. Description of Prior Developments

Airfoil blades for turbines, compressors, fans and the like, and particularly jet engine turbine rotors and stators have been formed with internal passages through which a cooling fluid is directed to convectively cool the internal walls of the hollow blades. One prior approach to increase the convective heat transfer between the cooling fluid and the internal walls of the blades has been to provide turbulence promoters within the internal cooling passages to interrupt the boundary layer growth of the cooling fluid adjacent the internal walls. By producing turbulent flow adjacent the internal wall surfaces, an improvement in heat transfer from these surfaces to the cooling fluid can be realized. An example of one form of turbulence promoter is disclosed in U.S. Pat. No. 4,627,480, the specification of which is incorporated herein by reference.

One drawback associated with conventional turbulence promoters or turbulence generators has been the creation of a large loss in the pressure of the cooling fluid as it passes over and/or through the turbulence generator baffles or ports defined within the cooling fluid passages. This large pressure drop may be compensated for by increasing the cooling fluid pressure and/or increasing the cooling fluid flow rates. This compensation can detract from turbine engine performance and efficiency as the engine must provide additional bypass air which otherwise would be used for combustion. Moreover, this air dilutes the temperature of the gasses exiting the combustor and thus decreases the turbine rotor inlet temperature. This further reduces engine performance.

Another drawback associated with prior turbulence generators is their inability to concentrate the turbulent flow of the cooling fluid directly at and/or along the wall surfaces being cooled. As boundary layer growth along the walls impedes heat transfer, failure to reduce or break apart the boundary layer reduces the effectiveness of the cooling fluid in removing heat from the wall surfaces.

Still another drawback associated with prior convective cooling passages is the presence of high velocity cooling fluid in the central regions of the passages where it is not required. That is, prior cooling fluid passages allowed high velocity cooling fluid to flow through the center of the passage where it is ineffective in removing heat from the walls of the passage. To compensate for this condition, higher flow rates are required.

Accordingly, a need exists for a turbulence generator which avoids the creation of large pressure losses in the cooling fluid as it flows over wall surfaces being cooled. A need also exists for a coolant flowpath configuration which concentrates a flow of high velocity cooling fluid along localized portions of the flowpath wall surfaces so as to promote the creation of turbulent flow within the cooling fluid in order to disrupt boundary layer growth and enhance heat transfer. A further need exists for a turbulence generator which prevents high velocity cooling fluid from flowing through the center of a cooling fluid flowpath where it provides little aid in cooling the surfaces of the flowpath passage.

SUMMARY OF THE INVENTION

The present invention has been developed to fulfill the needs noted above and therefore has as a primary object the provision of a turbulence generator which reduces pressure losses in a cooling fluid as the fluid passes over the internal walls of a machine element being cooled.

Another object is to provide a turbulence generator which concentrates a high velocity flow of cooling fluid at localized surface regions of a cooling passage while allowing the flow velocity of the fluid to decrease at points spaced away from those surfaces, such as within the central regions of the passage.

Briefly, the invention includes a cooling passageway within which localized shear jets are produced through the use of a partition which divides the flow within the passageway into a pair of undulating or wave-like subpassages. As the cooling fluid flows through each subpassage, it is periodically accelerated and decelerated by the changes in flow path cross section produced or defined by the partition. Localized, spaced apart, minimum throat areas are formed between the partition and the internal walls of the cooling passageway for producing a fluctuating or oscillating velocity within the cooling fluid as it flows through the passageway.

As the cooling fluid leaves a minimum throat area, it produces a high velocity shear jet flow directed close to the wall of the passageway thereby effecting a scrubbing action against the wall so as to promote efficient heat transfer. After leaving the minimum throat area, the flow path section increases thereby producing a deceleration in the cooling fluid. This deceleration produces an oscillation in the velocity of the shear jet as the fluid travels downstream thereby further producing effective convective cooling action adjacent the wall of the passageway.

By allowing the flowpath section to increase downstream of each shear jet, only lower velocity vortex flow is maintained within the central regions of the passageway. This conserves the flow pressure and maintains a high velocity flow only where it is required, that is, directly against and in near adjacency to the walls of the passageway.

The turbulence and scrubbing action of the cooling fluid may be further enhanced by adding rib members along the walls of the passageway at locations spaced between the minimum throat areas. Another approach to increasing this turbulence is to form bleed holes through the partition which separates the subpassages so that a jet flow is produced through the bleed holes from one subpassage to the other and in a direction which further forces the cooling fluid against the walls of the passageway.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings:

FIGS. 2 and 3 are longitudinally sectioned fragmental front elevation views showing details of FIG. 1;

FIGS. 4 through 7 depict alternate configurations of the passageway partitions;

FIG. 10 is a cross-sectional view taken through line A—A of FIG. 8;

FIG. 12 is an axial cross-sectional view taken through the airfoil blade of FIG. 11.

In the various figures of the drawing, like reference characters designate like parts.

DETAILED DESCRIPTION OF THE PREFERRED EMBODIMENTS

Figure 1:
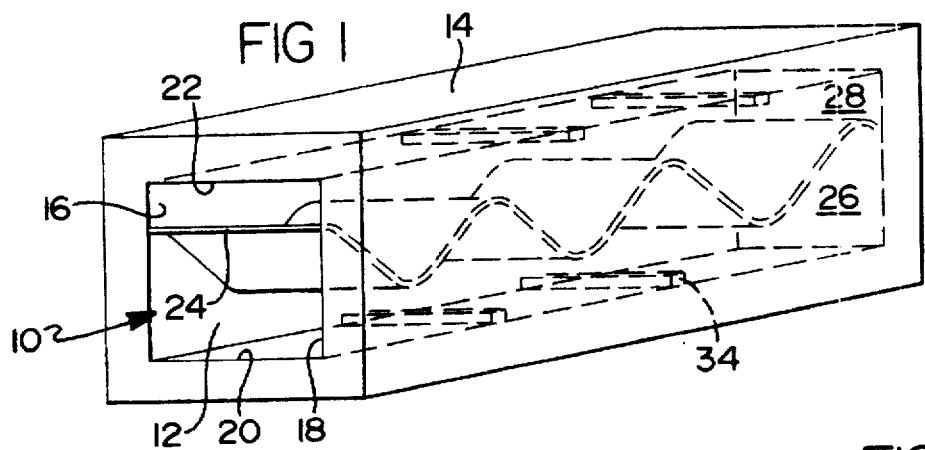
FIG. 1 is a schematic perspective view of a cooling passageway formed within a machine element provided with an undulating partition according to the invention.

The present invention will now be described in conjunction with the drawings beginning with FIG. 1 which shows in schematic form the basic features of a cooling passageway adapted to produce localized shear jets in accordance with the invention. Passageway 10 may be formed as a bore 12 in any machine element such as tube 14, but as discussed below, the shear jet cooling passageway 10 is particularly adapted for use in an air cooled turbine engine airfoil. Although bore 12 in machine element 14 defines a cooling fluid flowpath having a rectangular cross section, the present invention may be incorporated within any flow path cross sectional configuration.

Passageway 10 includes opposed side walls 16, 18, floor wall 20 and roof wall 22. An undulating, wavy flow divider or partition 24 is securely mounted within the passageway 10 to sidewalls 16, 18.

Partition 24 separates passageway 10 into a pair of subpassages 26, 28. The first subpassage 26 is defined between the partition 24, floor wall 20 and sidewalls 16, 18 while the second subpassage 28 is defined between the partition 24, roof wall 22 and sidewalls 16, 18.

As more clearly seen in FIG. 2, the cooling fluid, represented by the directional flow arrows, is constricted into a high velocity shear jet 29 adjacent each minimum throat area 30 formed between each crest 31 on partition 24 and opposed walls 20 and 22. The generally sinusoidal profile of partition 24 results in the crests of subpassage 26 being staggered between the crests of subpassage 28. As described below this creates an advantageous pressure distribution across and along each side of the partition.

As the cooling fluid approaches the throat areas 30, it is accelerated by the decreasing cross section of each subpassage flowpath and as the fluid departs the throat areas, it is injected in the form of a high velocity shear jet directed close to, along and generally parallel to the heated surfaces of walls 20 and 22. Thus, at throat areas 30, the static pressure of the cooling fluid is at its lowest. As the cooling fluid travels further downstream from the throat areas, the cross section of each respective subpassage flowpath increases to a maximum at about point 32 where the velocity of the fluid generally decreases to a minimum and forms a localized vortex. At this point, the static pressure of the cooling fluid is at a local high point.

Because of the downstream deceleration of the cooling fluid following its shear jet formation and injection into a larger flow path section, the velocity of the shear jet will oscillate from one throat area 30 to the next. This oscillation in the velocity of the cooling fluid produces a highly effective convective cooling action adjacent the walls 20, 22 of each respective subpassage 26, 28. Moreover, the only substantially high velocity flow which occurs is produced and directed in near adjacency to the walls 20 and 22, with lower velocity vortex flow taking place in the central regions of the passageway where high velocity flow is not needed. This arrangement minimizes fluid flow pressure losses and results in highly effective and efficient convective cooling of the passageway walls.

It is possible to further increase the heat transfer from the walls of the passageway by providing turbulence promoting members on the walls 20, 22 at locations spaced between the throat areas 30. The turbulence promotors or "turbulators" as seen in FIGS. 1 and 3, can take the form of rib members 34 which extend transversely across each subpassage. The turbulator ribs project inwardly from the subpassage walls into the interior of the subpassage to trip or disrupt the growth of the cooling fluid boundary layer along the walls and generate additional localized turbulent flow adjacent the walls of each subpassage.

The heat transfer from the passageway walls to the cooling fluid can be even further enhanced by forming cooling fluid bleed holes through certain portions of the partition 24. As shown in FIG. 3, bleed holes or ports 36 are advantageously formed slightly downstream from the minimum throat areas 30 and upstream from the maximum area flow sections 32.

Because the acceleration and deceleration of the cooling fluid takes place at the same time on opposite sides of the partition 24, the static pressure of the cooling fluid adjacent the concave side 38 of each wave crest or undulation in the partition wall is greater than that on the corresponding convex side 40. This pressure differential causes the cooling fluid to flow through the bleed holes 36 from the concave side to the convex side of each undulation in a supplemental jet flow represented by directional arrows 42.

The bleed holes are oriented with their bore axes pointing at least partially toward the opposing wall on the low pressure side such that each supplemental jet flow 42 is at least partially directed toward an opposing or confronting passageway wall 20, 22. This supplemental jet flow orientation reacts with and pushes each shear jet emerging from a minimum throat area 30 closer to its respective subpassage wall to further reduce the boundary layer height between the shear jet and the wall. In addition, the interaction between the shear jet flow and the supplemental jet flow generates vortices which further enhance heat extraction from the walls by further breaking up the boundary layer adjacent the walls with a scouring action.

Although a smooth wavy or sinusoidal shaped partition is advantageous, other partition forms may be used as seen in FIGS. 4 through 6. In FIG. 4 a sawtooth or angular zig zag partition is provided within passageways 10 for producing the desired spaced apart shear jets. Shear jets may also be formed as seen in FIG. 5 by rectangular shaped baffles 44 which transversely span passageway 10 at regular intervals. Each baffle 44 may be supported on a central shaft or support 46 which extends longitudinally through the center of the passageway or may be connected to the passageway side walls. Support 46 may either extend completely across passageway 10 to subdivide the passageway into two substantially isolated subpassageways 26, 28 as in FIG. 1, or shaft 46 may extend only partially across passageway 10 thereby allowing fluid communication between the subpassages 26, 28.

Cylindrical baffles 48 are shown in FIG. 6 as being arranged transversely across passageway 10 as in FIG. 5 for producing shear jets at minimum throat areas 30. A varient of this embodiment could include the substitution of spherical baffles in place of the rectangular or cylindrical baffles. In this case, all four walls of the passageway 10 would experience localized shear jets. The same result could be achieved with the embodiment of FIG. 5 by providing a circumferential clearance between each side 50 of each baffle 44 and its confronting wall surface 16, 18, 20 and 22.

Figure 7:
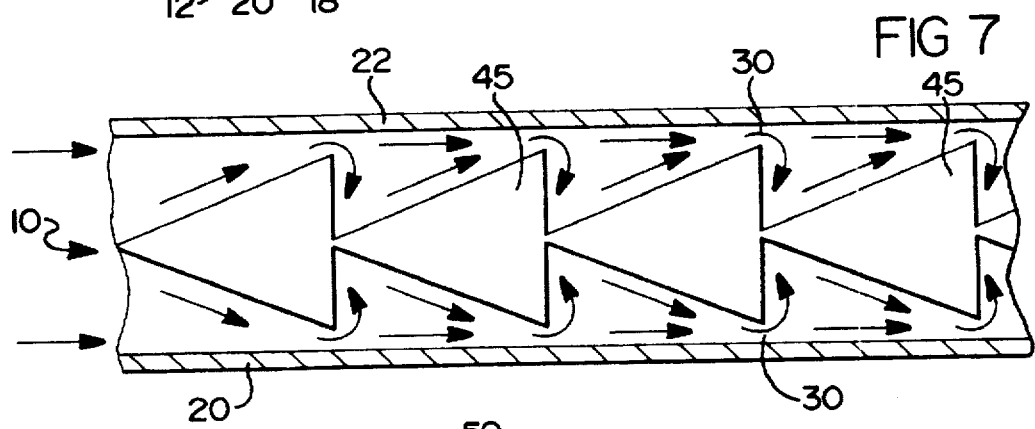

Another possible baffle configuration is shown in FIG. 7 wherein baffles 45 are formed with triangular cross sections which extend transversely across passageway 10 to produce shear jets adjacent passageway walls 20 and 22. It is also possible to form the baffles 45 as a series of interconnected, axially spaced conical members arranged in a manner similar to that shown in FIG. 7 for producing shear jet flow adjacent all four walls of passageway 10.

As stated above, the present invention is most suitable for incorporation within an airfoil. An example of such an airfoil is the aircraft jet engine turbine blade 52 shown in FIG. 8. Although a turbine rotor blade 52 is shown, the invention is equally applicable to turbine stator blades as well. Turbine blade 52 includes a shank portion 54 with a dovetail 56 for attachment to a turbine rotor disc, and an airfoil blade portion 58 whose root 60 is attached to the shank portion 54. Cooling air enters the shank portion through inlet 62 and then flows through internal coolant passageways formed in the airfoil blade portion 58 and exits through the blade tip 59. The blade tip cap is removed for clarity to show the internal configuration of the blade.

Figure 8:
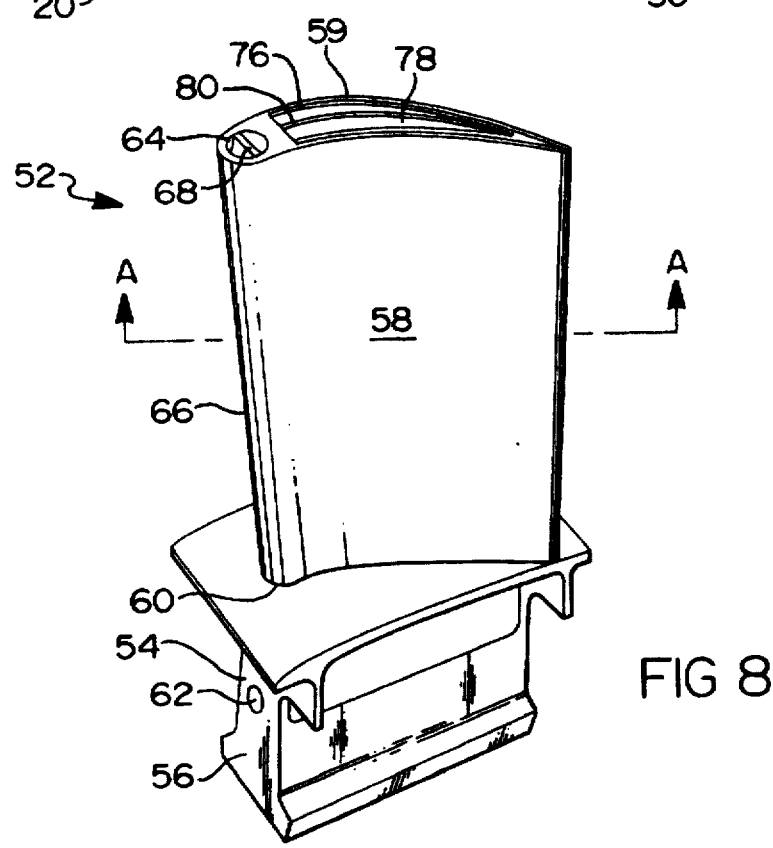
FIG. 8 is a perspective view of a hollow airfoil blade having an internal passageway fitted with an undulating flow dividing partition.
Figure 9:
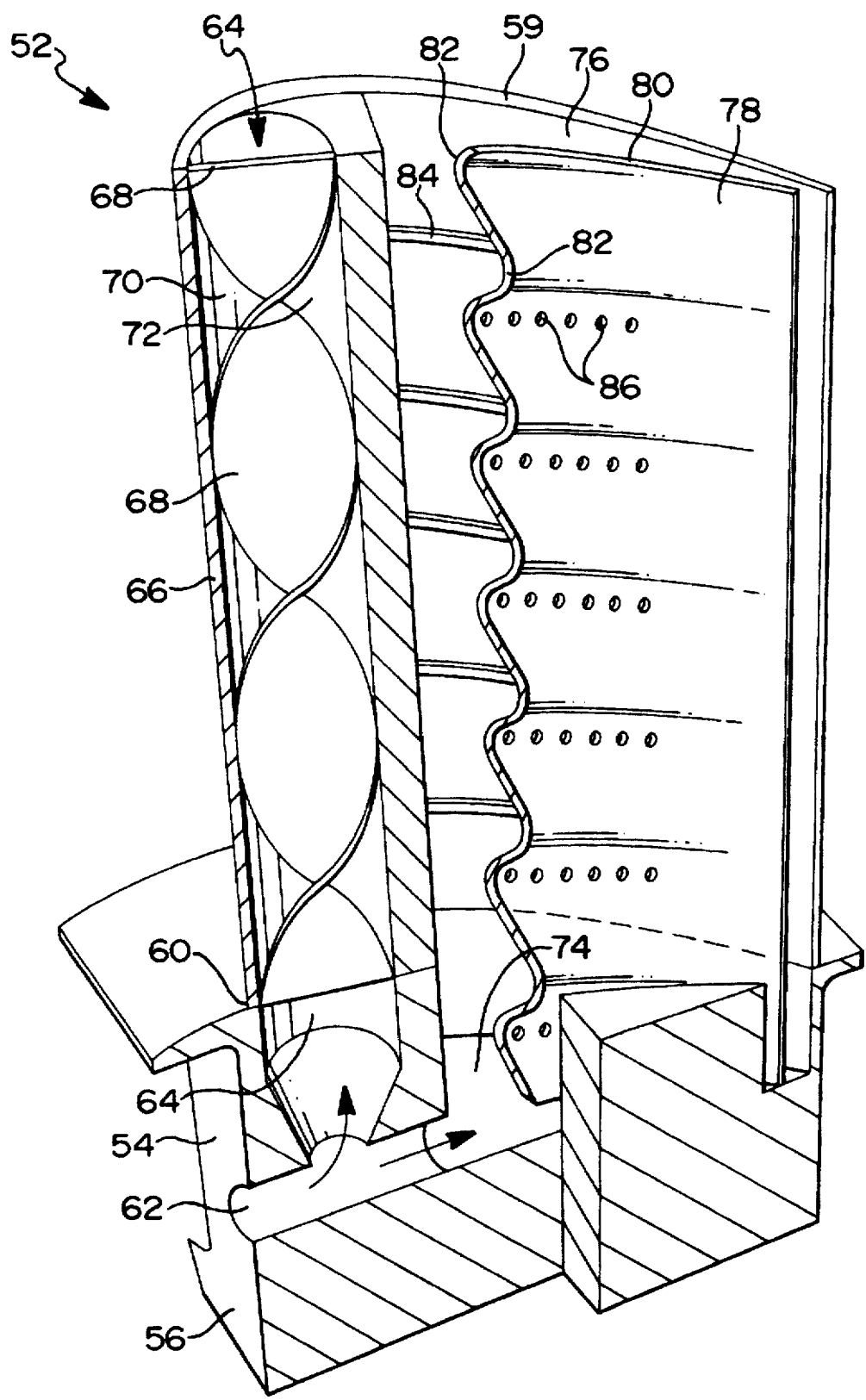
FIG. 9 is a radially sectioned view of FIG. 8.

One particular coolant passageway configuration shown in FIGS. 8, 9 and 10 provides for cooling air to flow radially outwardly from inlet 62 (FIG. 9) through a cylindrical passage 64 extending along the interior of the leading edge 66 of blade portion 58. A helical or twisted tape or foil insert 68, the details of which are disclosed in copending application Ser. No. 415,756, filed on Oct. 2, 1989, now U.S. Pat. No. 5,002,460 entitled Internally Cooled Airfoil Blade, extends through and divides passage 64 into two subpassages 70, 72. Cooling air also flows into the central portion of the blade 52 through chamber 74 which extends radially from shank portion 54 to open tip portion 59.

Chamber 74 is divided into two separate cavities or subpassages 76, 78 (FIG. 8) by an undulating partition 80 arranged in a fashion similar to that depicted in FIG. 1. Partition 80 can be fabricated as a separate insert or as an integral cast or brazed portion of the blade 52. Air entering chamber 74 is directed radially outwardly from the root portion to the tip portion in a series of radially spaced shear jets and exits through blade tip 59 via subpassages 76, 78.

As described above in conjunction with FIG. 1, the cooling air flowing through subpassages 76, 78 is channelled into localized radially outwardly flowing shear jets at spaced apart minimum throat areas formed between the radially staggered crests 82 of partition 80 and the confronting surface of the interior walls of chamber 74. Turbulator ribs 84 may be formed or fabricated on the interior walls of chamber 74 for enhancing heat transfer as described above. Moreover, bleed jet flow ports 86 may also be formed through partition 80 in the same fashion as that described above in conjunction with FIG. 1.

In the application of the present invention to a stator vane, air exiting the airfoil vane tip 59 can be subsequently directed to other locations within the jet engine for regenerative or other cooling purposes. Because the shear jets, as produced by partition 80 along or in combination with the air turbulence generated by turbulator ribs 84 and/or the bleed jets created by flow ports 86, are all close to the internal walls of chamber 74, the heat transfer from blade portion 58 to the cooling air is significantly enhanced without a large penalty in cooling air pressure drop.

Figure 11:
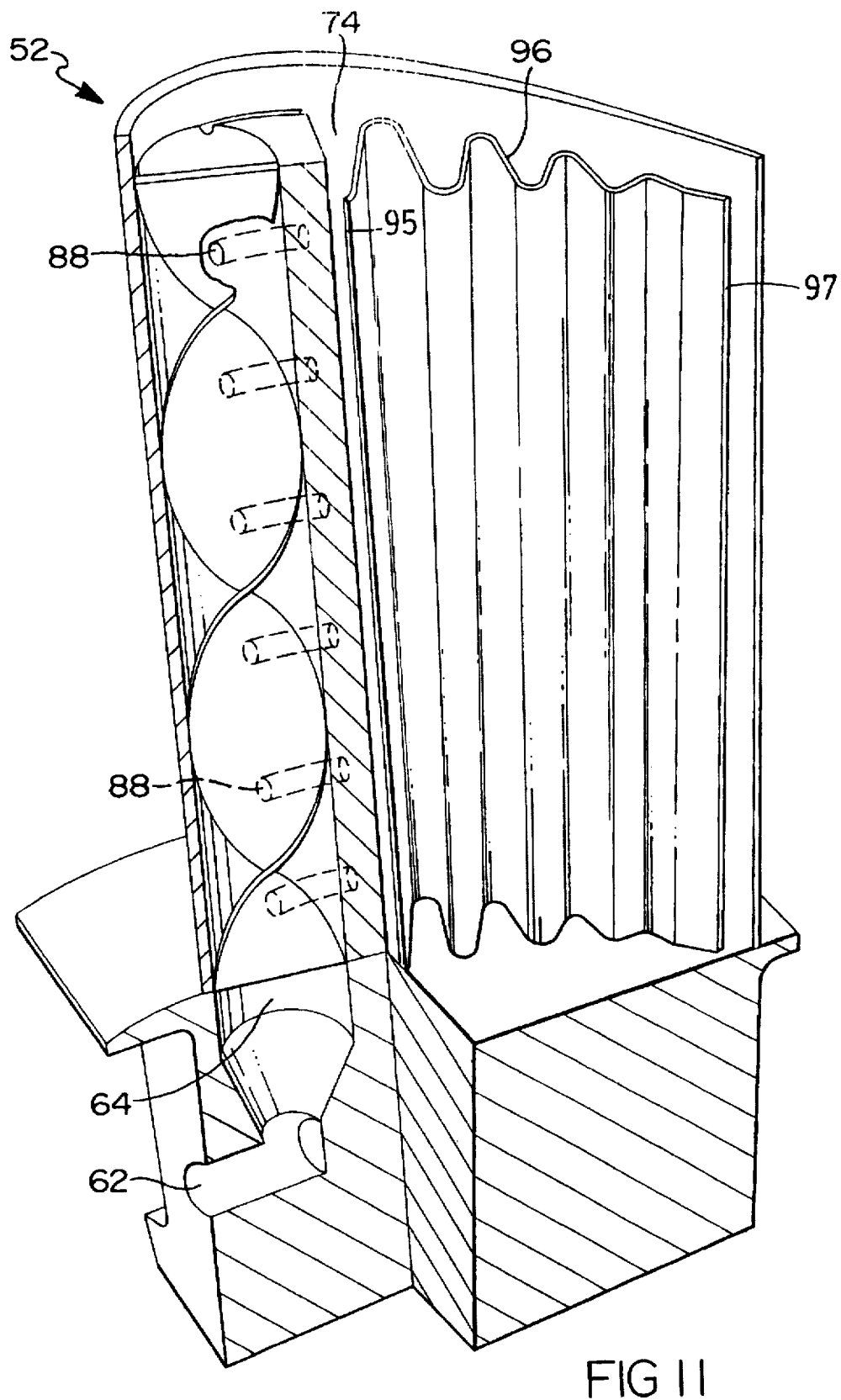
FIG. 11 is a radially sectioned perspective view of an alternate embodiment of the airfoil blade cooling passageways of FIG. 8.

Another jet engine turbine blade design similar to that just described is shown in FIGS. 11 and 12 wherein two rows of cooling air channels 88 are formed through a wall or web 90 which separates cylindrical passage 64 and its subpassages 70, 72 from chamber 74. Channels 88 provide for a flow of cooling air from the leading edge portion of the airfoil blade to its trailing edge portion. One set or row of radially spaced channels 88 is located adjacent a first side wall 92 of the blade portion 58 while a second set or row of radially spaced channels 88 is located adjacent a second side wall 94 of the blade portion 58.

A wavy or undulating partition 96 is securely fitted within or integrally formed within chamber 74 to generate shear jet cooling as specified above. In this design, however, the undulations or crests are arranged in a staggered fashion from the leading edge 95 of the partition to its trailing edge 97 so that the shear jets are directed toward the trailing edge 98 of the blade portion 58. Due to envelope design restrictions, the amplitude of the undulations decreases from the leading edge 95 to the trailing edge 97, but the size of the minimum throat areas is maintained about constant throughout to maintain a steady or constant flow rate. Turbulator ribs and bleed flow jet holes can be used in this design in a manner similar to that described in conjunction with FIGS. 3 and 9.

Holes or slots 100 are provided along the trailing edge 98 to cool the trailing edge of the blade portion 58 and to allow the cooling air to exit chamber 74. During engine operation the cooling air flows from inlet 62 through passage 64, through channels 88, across partition 96 and exits from slots 100 to cool the trailing edge 98. This design combines the advantages of helical flow cooling with shear jet cooling in a single airfoil cooling design.

Because the total cooling flow is used to cool both the leading edge 95 (via passage 64) and the central and trailing edge portions of the airfoil, cooling air requirements may be reduced. The helical flow within the passage 64 reduces the temperature gradient and thermal stresses between the leading edge and web wall 90. In addition, film cooling, which is an effective mechanism to reduce heat load to the airfoil, may be used in combination with shear jet cooling. Accordingly, film cooling holes 102 as shown in FIGS. 10 and 12 can be incorporated with the shear jet passage for additional cooling.

There has been disclosed heretofore the best embodiment of the invention presently contemplated. However, it is to be understood that various changes and modifications may be made thereto without departing from the spirit of the invention. For example, passageway partitions formed according to the present invention may be provided in any jet engine cooling passageway or apparatus for producing shear jet cooling. In particular, partitions may be located within the hollow walls of the combustor and exhaust nozzle to effectively cool these jet engine assemblies.

Moreover, the present invention may be used in combination with other methods for cooling airfoils. These other methods include forming a series of radially extending cooling passages around the entire periphery of the airfoil and locating a shear jet partition within the hollow central portion of the airfoil adjacent these radial cooling passages. When cooling a stator blade according to the present invention, cooling air may be directed radially inwardly through, for example, a high pressure turbine vane and then directed back to the exit of the compressor to effect a recuperative type of cooling.

What is claimed is:

1. A cooling passageway construction for cooling the interior of a heated machine element or machine assembly, said passageway comprising a partition subdividing said passageway into a first subpassage and a second subpassage, said partition having a wavy configuration defining a series of spaced apart minimum throat areas along said first and second subpassages such that said minimum throat areas defined along said first subpassage are staggered between said minimum throat areas defined along said second subpassage.

2. The construction of claim 1, wherein said partition is formed with a plurality of perforations for allowing fluid communication between said first and second subpassages.

3. The construction of claim 2, wherein said perforations are located adjacent to said minimum throat areas.

4. The construction of claim 2, wherein said perforations are located between said minimum throat areas.

5. The construction of claim 1, further comprising a turbulence generator located between a pair of said minimum throat areas in said first subpassage for preventing boundary layer growth therein.

6. The construction of claim 5, wherein said turbulence generator comprises a rib member projecting from said machine element into said first subpassage.

7. The construction of claim 6, wherein said rib member extends transversely across said first subpassage.

8. The construction of claim 1, wherein said machine element comprises an airfoil.

9. The construction of claim 8, wherein said airfoil comprises a turbine blade.

10. A gas turbine engine apparatus constructed with an internal cooling passageway defining a first wall and a second wall, said passageway having a partition extending therethrough so as to divide said passageway into a first subpassage and a second subpassage, said first subpassage having a flowpath cross section extending between said partition and said first wall and said second subpassage having a flowpath cross section extending between said partition and said second wall, said first and second subpassages respectively defining along with said partition, spaced apart minimum flowpath throat areas located between said partition and said first and second walls for producing high velocity flow along said first and second walls and further defining spaced apart low velocity flow sections located between said minimum throat areas and wherein said low velocity flow sections define a larger flowpath section that defined at said minimum throat areas.

11. An airfoil blade comprising:

an airfoil body having a root portion, a tip portion, a leading edge, a trailing edge and an internal coolant passageway having opposed walls located within said blade, and shear jet flow means provided in said coolant passageway for directing coolant flow through said coolant passageway along said walls in a series of spaced apart, localized high velocity flow jets.

12. The airfoil blade of claim 11, wherein said shear jet means comprises a flow constricting partition separating said coolant passageway into a first subpassage and a second subpassage.

13. The airfoil blade of claim 12, wherein said partition defines a series of spaced apart minimum throat areas within said first subpassage and within said second subpassage for producing said high velocity flow jets.

14. The airfoil blade of claim 13, wherein said partition comprises an undulating profile extending through said passageway such that said minimum throat areas defined within said first subpassage are staggered between said minimum throat areas defined within said second subpassage.

15. The airfoil blade of claim 14, wherein said partition is formed with a plurality of perforations located between said minimum throat areas.

16. The airfoil blade of claim 15, further comprising turbulence generating means projecting into said first subpassage between a pair of said minimum throat areas.

17. The airfoil blade of claim 13, further comprising turbulence generating means projecting into said first subpassage between a pair of said minimum throat areas.

18. The airfoil blade of claim 14, wherein said minimum throat areas extend from said root portion to said tip portion and wherein coolant flows through said minimum throat areas in a direction generally from said leading edge toward said trailing edge.

19. The airfoil blade of claim 18, wherein said undulating profile decreases in size toward said trailing edge.

20. The airfoil blade of claim 14, wherein said minimum throat areas extend from a central portion of said blade toward said trailing edge and wherein coolant flows therethrough in a direction generally from said root portion to said tip portion.

* * * * *